United States Patent [19]

Waddington et al.

[11] Patent Number: 5,009,935

[45] Date of Patent: Apr. 23, 1991

[54] PROTECTING METALLIC LAYERS ON SUBSTRATES

[75] Inventors: Keith J. Waddington, Essex; Peter W. Johnson, Chingford, both of England

[73] Assignee: MacPherson plc, Suffolk, England

[21] Appl. No.: 406,076

[22] Filed: Sep. 12, 1989

[30] Foreign Application Priority Data

Sep. 14, 1988 [GB] United Kingdom ............... 8821503

[51] Int. Cl.$^5$ ............................................. C23C 26/00
[52] U.S. Cl. ...................................... 428/457; 427/404; 427/165
[58] Field of Search ................. 427/404, 165; 428/457

[56] References Cited

U.S. PATENT DOCUMENTS

| | | | |
|---|---|---|---|
| 2,915,414 | 12/1959 | Hilemn | 427/404 |
| 4,098,730 | 7/1978 | Hilterhaus | 528/53 |
| 4,348,219 | 9/1982 | Levitt | 544/278 |
| 4,576,689 | 3/1986 | Makkaev | 427/383.1 |
| 4,740,392 | 4/1988 | Allan | 427/404 |
| 4,740,577 | 4/1988 | DeVoe | 528/59 |
| 4,894,278 | 1/1990 | Servais | 427/404 |

FOREIGN PATENT DOCUMENTS 1074076 6/1967 United Kingdom.

*Primary Examiner*—Shrive Beck
*Assistant Examiner*—Vi Duong Dang
*Attorney, Agent, or Firm*—Lee, Mann, Smith, McWilliams & Sweeney

[57] ABSTRACT

A method of producing an article comprises applying a non-ferrous metal layer on a substrate and protecting metal layer by applying thereto a compound having a nitrogen atom which is linked to the remainder of the compound by three single bonds and which has an accessible electron lone pair, such that the electron lone pair bonds to the metal to form a complex which is insoluble or substantially insoluble in water and which protects the metal layer. The compound is preferably 1,4-Diazobicyclo (2,2,2) octane. The method is of particular use in the production of mirrors comprising a transparent substrate on which is deposited a silver layer followed by a copper layer, the compound being bonded to the copper layer by formation of the complex. The invention also provides an article made according to the method described above.

10 Claims, No Drawings

PROTECTING METALLIC LAYERS ON SUBSTRATES

FIELD OF THE INVENTION

This invention relates to the protection of metallic layers on substrates and is particularly (but not exclusively) concerned with the protection of mirror backings of silver and copper films on glass substrates.

BACKGROUND TO THE INVENTION

Mirrors are made by the successive application of silver and copper films to a glass substrate. The copper film is then protected by a protective paint layer to protect the metal films against degradation due to attack by moisture or contaminants in the atmosphere.

The metal films are liable to degradation due to oxidation and heat and to attack by contaminants in the atmosphere. The durability of the metal films is tested by standard industry tests, such as a salt spray test and a copper accelerated salt spray test (known as the CASS test).

It has been found that the durability of the resulting mirror is greatly enhanced if the paint layer is lead based. The explanation for this phenomenon is not clear but it seems that the lead compounds in the coating, although being only sparingly soluble, may act in two ways:

1. to "poison" the copper/silver cell and prevent electron transfer and hence destruction of the layers, or
2. to act as a sacrificial electrode leaving the copper/silver layers unaffected.

If either of these explanations is correct one would expect other commonly available metals to provide the same protective effect. Many commonly available metals were tested and a number of rare metals also which from a consideration of their position in the electrochemical series should work. However, no metals other than lead provided the same protection.

The incorporation of lead based compounds in mirror backings is undesirable and the invention commenced with the aim of identifying a protective non-lead compound which could be used as an effective mirror backing. UK Patent Specification No. 1074076 discloses the use of substituted azoles to protect mirror backings but the applicants have found that these compounds do not perform well in the standard industry tests.

SUMMARY OF THE INVENTION

According to one aspect of the invention a method of producing an article comprises applying a non-ferrous metal layer on a substrate and protecting the metal layer by applying thereto a compound having a nitrogen atom which is linked to the remainder of the compound by three single bonds and which has an accessible electron lone pair, such that the electron lone pair bonds to the metal to form a complex which is insoluble or substantially insoluble in water and which protects the metal layer.

It is thought that the linking of the nitrogen atom to the remainder of the compound by three single bonds is important because the three single bonds act, by virtue of the bond angles, to expose the lone electron pair, so making it active for formation of the complex with the metal. The complex, being insoluble, remains to protect the metal layer to an extent which gives excellent results in the standard salt spray and CASS tests.

The metal is preferably copper but the formation of the protective complex may occur with other non-ferrous metals such as manganese, strontium, chromium, nickel, zinc, cobalt, vanadium, titanium or scandium. Each molecule of the compound preferably has two or more nitrogen atoms each bonded to the remainder of the molecule by three single bonds and each presenting a lone electron pair for complexing with the metal.

A preferred compound is 1,4-Diazobicyclo (2,2,2) octane, known commercially as DABCO and having the formula

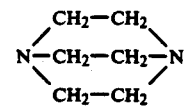

The compound is preferably applied to the metal layer in a coating composition, which in the case of DABCO preferably contains between 0.16 and 4% of DABCO by weight. More preferably the composition contains between 1.5 and 3% of DABCO by weight, and most preferably around 2.3%.

Alternatively, the metal layer may firstly be washed with a solution of the compound in a suitable solvent, prior to the application of any further coating layers.

Another possible compound, quinuclidine, may be used, having the formula

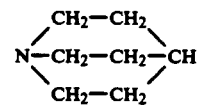

Other compounds of the basic DABCO or quinudidine form, but having one or more substituents other than hydrogen on the framework carbon atoms, may also be of use in the present invention.

The compound is preferably applied to the metal layer under acidic conditions. An acidic environment tends to cause faster formation of the complex with the metal. Typically, the compound will be applied at pHs between 2 and 4, most typically at around pH 3. This may be achieved by the presence of an acid such as phosphoric acid in the coating composition to be applied to the metal.

The article produced may be a mirror, in which case the substrate is transparent (usually glass) on which is deposited a silver layer, followed by a copper layer to which the compound is bonded as a result of the formation of the complex.

The compound applied to protect the metal layer is preferably applied to a freshly deposited metal layer.

According to another aspect, the invention provides an article made according to said one aspect.

Examples of the invention will now be described by way of example.

EXAMPLE 1

A cleaned glass sheet is coated with a layer of silver, and a layer of copper. Both are deposited by the spraying method. To this sheet is applied an air drying alkyd coating composition containing 7% DABCO 33 LV (see below).

A typical formulation would be:

|  | wt % |
|---|---|
| *Short oil linseed alkyd (50% NVC) | 40 |
| **Phenolic Resin | 4 |
| TALC | 20 |
| Pigment | 10 |
| Methylethylketoxime | 0.2 |
| Polydimethylsiloxane surfactant | 0.2 |
| Cobalt Octoate 12% | 0.2 |
| Xylene | 18.4 |
| ***DABCO | 7 |
|  | 100.0 |

*A short oil linseed alkyd having the following properties:
Fatty acid content = 33%
Phthalic anhydride content = 49%
Polyol = Glycerol
Viscosity = 14–18 dPas
Non-Volatile Content = 50%
Main Volatile Component = Xylene
Acid Value = 65 mg KOH/g
**Type number CKR 2400, obtainable from British Petroleum.
***In the form of a solution of 33 weight percent DABCO in propylene glycol. (DABCO 33LV)

The above formulation is ground for 5 minutes in a horizontal pearl mill. After milling, the material is cooled to room temperature and the viscosity adjusted if necessary with xylene (120 s BS 3900 B4 cup). The finished coating is applied to the metallic surface of the glass sheet at a thickness of 75 microns and then stoved for 4 min at 120° C. The sheet of glass is left to cool and age for at least 24 hrs. The resulting coating/mirror combination passes both the CASS test and salt spray, in addition to a further standard test known as the humidity test (DIN 150017 SK).

EXAMPLE 2

A cleaned glass sheet is coated with a layer of silver, and a layer of copper, by spraying as previously described in Example 1.

The mirror thus made is then either sprayed or dipped in the following composition.

| Ethanol/water 50:50 | 96.91% by wt. |
|---|---|
| Fumed silica | 3.00% |
| Copper (II) chloride | 0.05% |
| DABCO hydrochloride salt | 0.04% |
|  | 100.00% |

The mirror is then oven dried at 60° C. for approximately 2 mins until dry.

The resulting complexed mirror is washed with deionised water to remove any residues, and then coated with a lead free backing paint. This combination of processes results in 1000 hrs salt spray pass.

EXAMPLE 3

A cleaned glass sheet is coated with silver and copper layers, followed by a coating formulation containing DABCO, as described in Example 1. The proportion of DABCO (in the form of DABCO 33 LV, i.e. a solution of 33 weight percent DABCO in propylene glycol) in the coating formulation is varied and the proportion of xylene adjusted to compensate. The resultant coating/mirror combination is subjected to the standard CASS, salt spray and humidity tests, and the results compared with those for a laboratory standard, in which a mirror was coated with a formulation containing no DABCO. The results are also compared to those achieved by the use of a lead-based coating formulation containing lead cyanamide and tribasic lead sulphate.

The results are shown in Tables I and II below. A result in the CASS or salt spray test of greater than 3.5 indicates a pass; for the humidity test, a pass is represented by a score of 5 or above.

In Table II (Test 2), the CASS and salt spray test results are separated into those for edge creep (E) and those for spots of corrosion appearing on the main body of the mirror (S). The corresponding results in Table I (Test 1) take both of these factors into account.

The tables show that acceptable results in the standard tests can be achieved by the use of mirror coating formulations containing DABCO. Formulations containing between 5 and 15 weight percent DABCO 33 LV give particularly good results which compare favourably with those for lead-based formulations.

TABLE I

| | | (Test 1) | | | |
|---|---|---|---|---|---|
| Weight % of DABCO 33LV in coating formulation | Actual weight % of DABCO in coating formulation | CASS test | Salt Spray test | Humidity test | Comments |
| 0 | 0 | 2 | 1 | 5 | Laboratory Standard |
| 0.05 | 0.016 | 2 | 3 | 4.5 | |
| 1.0 | 0.33 | 2 | 3+ | 5 | |
| 2.0 | 0.66 | 2.5 | 3 | 5 | |
| 5.0 | 1.66 | 3 | 3.5 | 5 | |
| 7.71 | 2.57 | 3.5 | 2.5 | 5 | |
| 0 lead containing | 0 | 4 | 5 | 5 | Lead-based coating |

TABLE II

| | | (Test 2) | | | | | |
|---|---|---|---|---|---|---|---|
| Weight % of DABCO 33LV in coating formulation | Actual weight % of DABCO in coating formulation | CASS test | | Salt Spray test | | Humidity test | Comments |
| | | E | S | E | S | | |
| 0 | 0 | 0 | 0 | 1 | 1 | 5 | Laboratory Standard |
| 7.0 | 2.33 | 4 | 3.5 | 4 | 3.5 | 5 | |
| 10.0 | 3.33 | 4 | 3.5 | 4– | 3.5 | 4.5 | |
| 15.0 | 5.0 | 4 | 3.5 | 3+ | 3+ | 5 | |
| 0– | 0 | 5 | 5– | 5 | 5– | 5 | Lead-based coating |

TABLE II-continued

| Weight % of DABCO 33LV in coating formulation | Actual weight % of DABCO in coating formulation | (Test 2) | | | | Humidity test | Comments |
| --- | --- | --- | --- | --- | --- | --- | --- |
| | | CASS test | | Salt Spray test | | | |
| | | E | S | E | S | | |
| lead containing | | | | | | | |

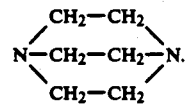

What is claimed is:

1. A method of producing an article comprising applying a non-ferrous metal layer on a substrate and protecting the metal layer by applying thereto a compound having a nitrogen atom which is linked to the remainder of the compound by three single bonds and which has an accessible electron lone pair, such that the electron lone pair bonds to the metal to form a complex which is insoluble or substantially insoluble in water and which protects the metal layer.

2. A method according to claim 1 wherein the metal is copper.

3. A method according to claim 1 wherein the compound is 1,4-Diazobicyclo (2,2,2), octane, known commercially as DABCO ® and having the formula:

4. A method according to claim 3, wherein the DABCO is applied to the metal layer in a coating composition containing between 0.16 and 4.0 of DABCO ® by weight.

5. A method according to claim 4, wherein the coating composition contains 2.3% of DABCO ® by weight.

6. A method according to claim 1 wherein the compound is applied to the metal layer under acidic conditions.

7. A method according to claim 6 wherein the compound is applied to the metal layer at a pH of around 3.

8. A method according to claim 1 wherein the compound is supplied to a freshly deposited metal layer.

9. A method according to claim 1 wherein the article is a mirror comprising a transparent substrate on which is deposited a silver layer followed by a copper layer, to which copper layer the compound is applied.

10. An article made according to the method of claim 1.

* * * * *